Feb. 20, 1968  R. F. COLEMAN  3,369,736
FORCED VENTILATION FOR MOTOR COOLING ON ENCLOSED MOTOR
DRIVEN COMPRESSOR UNIT
Filed April 26, 1966

RALPH FRANCIS COLMAN
INVENTOR.

BY Daniel H. Bobis
Atty.

United States Patent Office 3,369,736
Patented Feb. 20, 1968

3,369,736
FORCED VENTILATION FOR MOTOR COOLING ON ENCLOSED MOTOR DRIVEN COMPRESSOR UNIT
Ralph Francis Coleman, Thompsonville, Conn., assignor to Worthington Corporation, Harrison, N.J., a corporation of Delaware
Filed Apr. 26, 1966, Ser. No. 545,312
3 Claims. (Cl. 230—117)

ABSTRACT OF THE DISCLOSURE

An apparatus for cooling the windings of the electrical motors used in enclosed industrial motor driven compresor units. The apparatus includes a shrouded fan which establishes a flow of cooling air within the electrical motor housing by forceably withdrawing air from the motor housing through air ducts which connect the shroud of the fan directly to the motor housing. The fan exhausts remotely from the motor compartment of the compressor unit to prevent the recirculation of the air which has cooled the electric motor windings.

---

Figure 1:
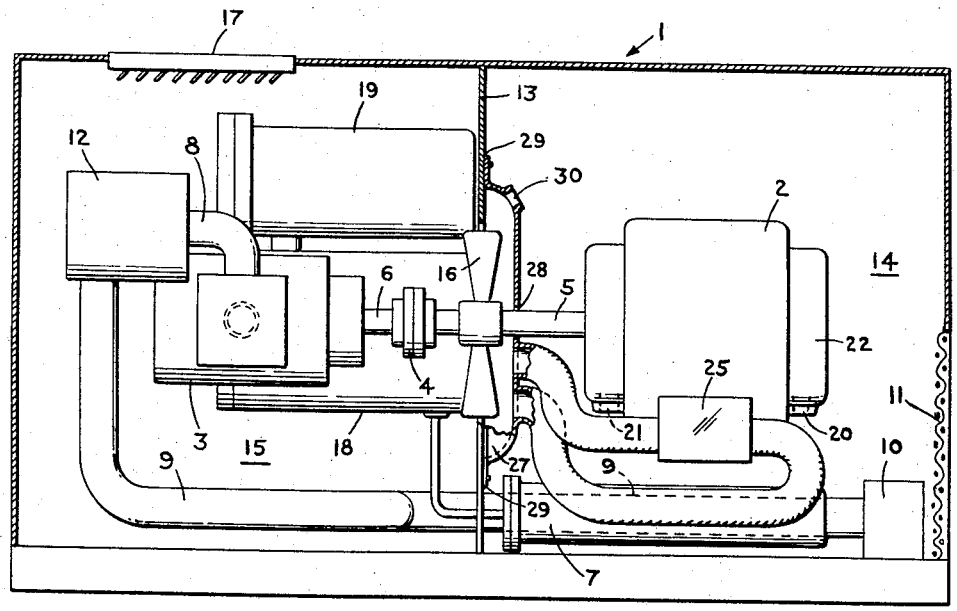

The present invention relates generally to an improvement in the motor cooling apparatus of an enclosed motor driven compressor unit, and more particularly, to a more efficient fan cooling apparatus by which maximum fan power can be utilized in forceably withdrawing warmed air from the motor housing of the electric motor in such a unit.

In enclosed rotary industrial air compressor units, it is advantageous to flow cooling air across the motor to reduce motor temperature at increased or high loads, because this helps to prevent reduction of motor life and failure of the motor. It is also desirable to flow air through the motor housing so that the air may withdraw heat directly from the motor windings. The general type of fan cooled enclosed motor compressor unit is disclosed in the co-pending application of Carl Bloom filed April 26, 1961, Ser. No. 545,311, titled, "Enclosed Motor Driven Compressor Unit." This type of unit comprises a motor and a compressor mounted in separate compartments with a fan disposed on the motor shaft driving the compressor shaft, which fan draws air from the motor compartment over and through the motor into the compressor compartment. The air entering the compressor compartment is discharged through a vent, as for example, at the top of the compressor compartment. It is common to have an oil cooler associated with the compressor mounted in the compressor compartment. This oil cooler may be either of the air cooled type or the water cooled type. In the said co-pending application the fan evacuating the motor compartment is often used to blow air over the air cooled oil cooler, in addition to performing its function of drawing air over the motor. A somewhat smaller fan is, therefore, required for use with water cooled oil coolers, since the latter do not depend for cooling on the passage of air across them. While a smaller fan may be used for water cooled oil cooler applications, it must nevertheless be large enough to create a substantial air flow through the motor compartment, since the device in the co-pending application depends upon total air flow, to create a vacuum or high velocity air stream in the motor compartment in order to draw air through the motor.

The improved apparatus herein disclosed is particularly adapted for use in units where the prime cooling consideration is the cooling of the motor windings, as for example, in units utilizing water cooleed oil coolers. It operates by forceably withdrawing the air in the motor housing which has been warmed by the windings of the motor, through air ducts which are connected to a shroud, which shroud is disposed between the fan and the motor and in contact with the partition separating the motor compartment from the compressor compartment and effectively encloses the fan from the motor compartment side so that maximum power of the fan is directed toward withdrawing warm air through the air ducts. A small opening is provided in the shroud which is used merely to ventilate the motor compartment by allowing the fan to draw a relatively small amount of air from the motor compartment.

Tests indicate that approximately one-third the horsepower would be needed to fan cool a motor if this improved apparatus were used as opposed to an apparatus which required total evacuation of the motor compartment. Use of the present device therefore results in greater efficiency and reduced initial and operating costs, since the fan size may be reduced.

Accordingly, it is an object of this invention to provide an improved fan operated air cooling system for the electric motor in an enclosed industrial motor driven compressor unit wherein the fan is disposed to draw air directly from within the motor housing.

It is another object of this invention to provide a more efficient fan cooling system for a fan cooled motor in an enclosed motor driven compressor unit wherein the necessity for a pressure balance between the motor and the motor compartment to compensate for leaks is eliminated.

Figure 2:
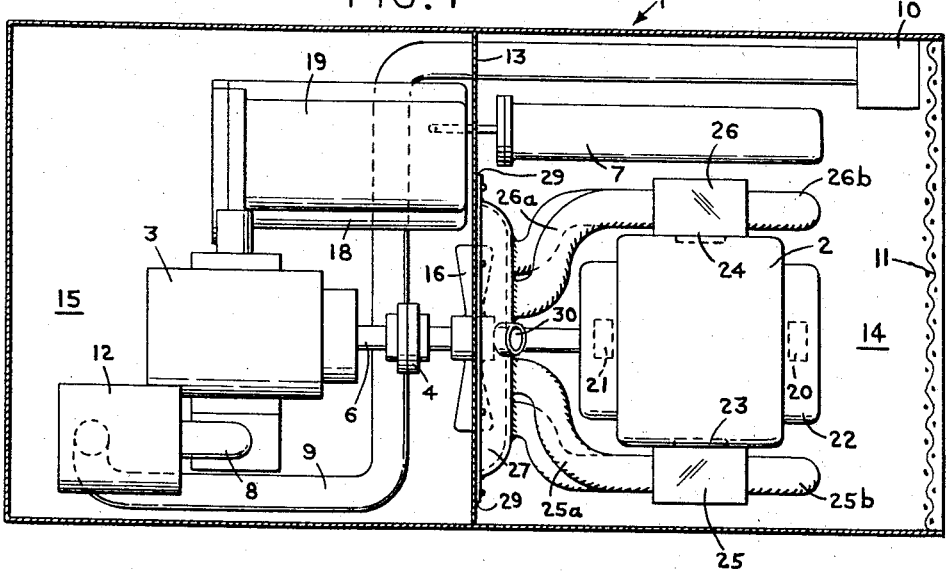

These and other objects and advantages of the invention will become evident from the following description with reference to the accompany drawings in which:

FIGURE 1 is an elevation of an enclosed motor driven fan cooled compressor unit with its associated equipment as an embodiment of this invention, with the side panel removed; and FIGURE 2 is a top view of the unit shown in FIGURE 1 with the top of the enclosure removed.

Referring to the figures, FIGURE 1 shows a compressor and motor unit totally enclosed in a sheet metal or other suitable enclosure 1. The basic elements of the motor compressor unit are shown, and include the motor 2, the compressor 3, and the coupling 4 connecting the motor drive shaft 5 with the driven shaft 6 of the compressor. Other well known elements are also shown, such as a water cooled oil cooler 7, oil tank 18, demister 19, and a compressor suction filter 12 connected to the suction inlet 8 of the compressor. The compressor inlet 8 communicates directly with the air filter 12. The conduit 9 from the compressor inlet air filter 12 is connected to and communicates with a small enclosure or box 10. This box communicates the compressor inlet air filter 12 directly with the panel filter 11, so that air is drawn by the compressor directly from without the enclosure through the panel filter 11, and is not drawn from within the enclosure.

As depicted, when the compressor is operating, suction air for the compressor will be drawn initially through the panel filter 11, thereby undergoing a preliminary cleaning and extending the life of the suction filter 12. This air is cooler and consequently denser than the air that is available around the compressor within the enclosure, which air has drawn off the heat from the motor windings and from the hot surfaces in the compressor compartment.

The enclosure is divided by a partition 13 into two compartments. The first compartment 14 contains the motor 2, and the second compartment 15 contains the compressor 3. A fan 16 for cooling purposes is mounted on the shaft between the two compartments in the plane of the partition.

A vent 17 (FIGURE 1) is provided in the top of the enclosure 1 to provide a means of egress for the warm air being exhausted from the enclosure 1 by the fan 16. The water cooled oil cooler 7 need not be in the path of this exhaust air.

The motor shown is preferably of an open drip proof type with an internal fan (not shown) for cooling purposes. Air inlets 20 and 21 are shown located at each end of the motor casing 22 and air outlets 23 and 24 are shown located on either side of the motor casing. Exhaust manifolds 25 and 26 are connected to air outlets 23 and 24 respectively. Each manifold has two exhaust ducts (designated 25a and 25b, and 26a and 26b) associated therewith which communicate the air inside the motor casing 22 with the shroud 27. Two ducts are used for each outlet in order to maximize the outlet flow area.

A shroud is shown disposed between the motor 2 and the fan 16. It is in sealed contact (as at 29) with the partition 13. With the exception of the small clearance space 28 (FIGURE 1) necessary for the motor shaft, and the small hole 30 used for ventilating the motor compartment 14, the motor compartment 14 and the compressor compartment 15 are not in direct fluid flow communication. Thus, in operation, most of the air drawn from the motor compartment 14 into the compressor compartment 15 will have had to pass through the motor casing 22. When the compressor 3 is operating, the fan 16 creates a suction within the shroud 27. This suction draws air from within the exhaust ducts 25a, 25b, 26a, and 26b causing air to move through the panel filter 11 into the motor inlet air ports 20 and 21, across the motor windings, and through the air outlets 23 and 24 and the exhaust manifolds 25 and 26 into the exhaust ducts.

In units where the motor has an internal fan, this fan also draws cooling air through the panel filter. However, when the action of this fan is combined with a negative pressure formed by the externally mounted fan 16 on the shaft, the total air movement through the motor is approximately double that which would normally be moved by the motor's internal fan. This increased air flow allows an added overload to be applied to the motor without a loss in motor life, since motor life is a function of winding temperature.

Since the shroud communicates the fan 16 directly with the motor air outlet ports 23 and 24 there is no need to have a balance of pressure between these motor ports and the motor compartment 14 to compensate for leaks at the ports. Nor does there have to be a high velocity air flow past the motor casing 22 to induce air to flow through the casing. Furthermore, the direct connection allows maximum fan power to be applied to withdrawing the warm air from the motor directly, rather then having the fan draw air generally from within the compartment and only indirectly through the motor.

The importance of maintaining low motor winding temperatures may be gauged by noting that motor life is reduced in half for each rise of approximately 10° C. in winding temperature, and that such a rise results from a overload of only 10 to 15%.

The motor life is further increased and the enclosure maintained clean by filtering the incoming air.

Heat radiated from the surface of the motor into the motor compartment is kept to the minimum by the internal and external fans. What heat there is, will be withdrawn by means of the ventilating hole 30 in the shroud 27, since the negative pressure within the shroud created by the fan 16 draws some air directly through the filter 11 and the motor compartment 14, independent of the air flow through the motor casing 22. All air moved by the fan is directly discharged through the opening 17 in the top of the compressor compartment.

It will be understood that various changes in the details, materials and arrangement of parts which have been herein described and illustrated in order to explain the nature of the invention, may be made by those skilled in the art within the principle and scope of the invention as expressed in the appended claims.

What is claimed is:

1. A compressor unit comprising:
   (a) an enclosure,
   (b) partition means dividing said enclosure into a first compartment and a second compartment,
   (c) said enclosure having a first inlet means therein communicating with a source of air external of said enclosure,
   (d) a compressor having a suction and a discharge within said second compartment,
   (e) first conduit means connecting the suction of said compressor with said first inlet means for drawing air into said compressor from without said enclosure,
   (f) second conduit means carrying the discharge of said compressor out of said enclosure,
   (g) an electric motor within said first compartment having a shaft extending through said partition and coupled to said compressor,
   (h) said enclosure having a second inlet means therein communicating said first compartment with a source of air external of said enclosure,
   (i) said enclosure having an outlet means therein communicating said second compartment with the air external of said enclosure,
   (j) a fan mounted on said shaft in the plane of said partition and between said first and second compartments,
   (k) a shroud disposed transversely of said motor shaft between said motor and said fan, and mounted to said partition about said fan,
   (l) said motor having a frame with air inlets and air outlets disposed therein, and
   (m) third conduit means connecting said motor air outlets with said shroud for permitting fluid flow communication between the area within the shroud where the fan is mounted and said motor air outlets, whereby upon operation of the motor, air is drawn through said second inlet means, through said motor air inlets, across said motor windings, and discharged from the motor air outlets through the conduit means into said second compartment, and out of said enclosure through said outlet means.

2. A compressor unit comprising:
   (a) an enclosure,
   (b) partition means dividing said enclosure into a first compartment and a second compartment,
   (c) said enclosure having a first inlet means therein communicating with a source of air external of said enclosure,
   (d) a compressor within said second compartment having a suction and discharge,
   (e) conduit means connecting the suction of said compressor with said first inlet means for drawing air into said compressor from without said enclosure,
   (f) an electric motor within said first compartment having a shaft extending through said partition and coupled to said compressor,
   (g) said enclosure having a second inlet means therein communicating said first compartment with a source of air external of said enclosure,
   (h) said enclosure having an outlet means therein communicating said second compartment with the air external of said enclosure,
   (i) a fan mounted on said shaft in the plane of said partition and between said first and second compartments,
   (j) a shroud disposed transversely of said motor shaft between said motor and said fan, and mounted to said partition about said fan,
   (k) said shroud having a restricted opening therein communicating said first compartment with said second compartment whereby air will be drawn directly from said first compartment into said second compartment and exhausted through said outlet means,
   (l) said motor having a frame with air inlets and air outlets disposed therein, and (m) conduit means connecting said motor air outlets with said shroud for permitting fluid flow communication between the area within the shroud where the fan is mounted and said motor air outlets, whereby upon operation of the motor, air is drawn through said second inlet means, through said motor air inlets, across said motor windings, and discharged from the motor air outlets through the conduit means into said second compartment, and out of said enclosure through said outlet means.

3. A unit as in claim 2 wherein:
(a) a first filter means is disposed on said enclosure in said first inlet means to filter the air being drawn into said compressor, and (b) a second filter means is disposed on said enclosure in said second inlet means, to filter the cooling air being drawn in said enclosure.

References Cited

UNITED STATES PATENTS

| | | | |
|---|---|---|---|
| 1,342,592 | 6/1920 | Orr | 230—117 |
| 2,328,038 | 8/1943 | Taylor | 230—117 |
| 2,733,000 | 1/1956 | Sparklin | 230—117 X |

ROBERT M. WALKER, *Primary Examiner.*